(12) United States Patent
Novotny et al.

(10) Patent No.: US 6,577,575 B2
(45) Date of Patent: *Jun. 10, 2003

(54) HEAD CLEANING IN OPTICAL DISK DRIVES

(75) Inventors: Vlad Novotny, Los Gatos, CA (US); Roger Hajjar, San Jose, CA (US)

(73) Assignee: Terastor Corporation, Milipitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/961,633

(22) Filed: Sep. 21, 2001

(65) Prior Publication Data

US 2002/0015373 A1 Feb. 7, 2002

Related U.S. Application Data

(62) Division of application No. 09/304,527, filed on May 4, 1999, now Pat. No. 6,307,832.

(51) Int. Cl.[7] .............................. G11B 3/58; G11B 7/12; G11B 15/46
(52) U.S. Cl. ..................... 369/71; 369/300; 369/13.33
(58) Field of Search ....................... 369/300, 71, 13.33; 360/234.7, 237.1

(56) References Cited

U.S. PATENT DOCUMENTS

| 4,870,636 | A | * | 9/1989 | Yamamoto | 369/292 |
|---|---|---|---|---|---|
| 5,228,022 | A | | 7/1993 | Compton et al. | |
| 5,375,110 | A | * | 12/1994 | Nakane | 369/47 |
| 5,396,476 | A | * | 3/1995 | Asthana | 369/44.25 |
| 5,424,884 | A | * | 6/1995 | Nonaka | 360/74.1 |
| 5,467,238 | A | | 11/1995 | Lee et al. | |
| 5,486,970 | A | | 1/1996 | Lee et al. | |
| 5,850,321 | A | * | 12/1998 | McNeil et al. | 360/106 |
| 5,881,042 | A | | 3/1999 | Knight | |
| 6,084,753 | A | * | 7/2000 | Gillis et al. | 360/128 |
| 6,307,832 | B1 | * | 10/2001 | Novotny et al. | 369/13.33 |

FOREIGN PATENT DOCUMENTS

| GB | 2 117 140 A | * | 10/1983 |
|---|---|---|---|
| JP | 58-222424 | | 12/1983 |
| JP | 61-248242 | * | 11/1986 |
| JP | 62-026620 | | 2/1987 |
| JP | 62-184637 | * | 8/1987 |
| JP | 62-204421 | | 9/1987 |
| JP | 62-204441 | * | 9/1987 |
| JP | 1-154377 | * | 6/1989 |
| JP | 2-206010 | * | 8/1990 |
| JP | 3-102607 | * | 4/1991 |
| JP | 3-120616 | | 5/1991 |
| JP | 3-192578 | | 8/1991 |
| JP | 4-061612 | | 2/1992 |
| JP | 4-076839 | | 3/1992 |
| JP | 5-047021 | | 2/1993 |
| JP | 5-094631 | | 4/1993 |
| JP | 5-274706 | | 10/1993 |
| JP | 5-314434 | * | 11/1993 |
| JP | 6-036323 | * | 2/1994 |
| JP | 6-267098 | * | 9/1994 |
| JP | 7-093728 | * | 4/1995 |
| JP | 2000-76632 | * | 3/2000 |
| JP | 2001-84539 | * | 3/2001 |
| JP | 2001-216669 | * | 8/2001 |
| WO | WO 83/01861 | * | 5/1983 |
| WO | 97/19449 | | 5/1997 |

OTHER PUBLICATIONS

"Self–Cleaning Magnetic Recording Slider", Jun. 1, 1996, IBM TDB, vol. No. 39, Issue No. 6, pp. 169–170.*

* cited by examiner

Primary Examiner—William Klimowicz
(74) Attorney, Agent, or Firm—Fish & Richardson P.C.

(57) ABSTRACT

An optical disk drive having a cleaning mechanism to clean the optical head by contact with a selected surface or in close proximity of a surface of the storage medium.

24 Claims, 6 Drawing Sheets

HEAD CLEANING IN OPTICAL DISK DRIVES

This application is a divisional of U.S. application Ser. No. 09/304,527 now U.S. Pat. No. 6,307,832, filed May 4, 1999.

FIELD OF THE INVENTION

The present invention generally relates to data storage, and more particularly, to a read/write head that couples radiation energy or other signals to and from a storage medium.

BACKGROUND

A typical optical storage system uses an optical head to focus a monochromatic optical beam to a small spot on a recording layer for reading and writing. The optical head may be positioned over the medium by a spacing greater than one wavelength, i.e., in a "far-field" optical configuration where the optical energy is coupled between the optical head and the medium by light propagation. An optical head with a large numerical aperture can produce a small spot size which has a lower limit on the order of one half wavelength due to the diffraction limit. The areal density of an optical storage device, hence, is limited by this diffraction-limited spot size.

An optical storage system can also operate in a "near-field" configuration where the optical head is spaced from the optical medium by a distance on the order of or less than one wavelength. The optical coupling between the optical head and the medium, therefore, can be effected by evanescent coupling, with or without light propagation. An effective numerical aperture of the optical head in such a near-field configuration can be greater than unity. Hence, a near-field optical storage system can achieve a focused beam spot size much less than one half wavelength and to realize a high areal storage density.

The optical head is a critical part of an optical storage system and its properties can significantly affect the overall performance of the system. In addition to the focusing of a read/write beam, the optical head also controls other operations of the system, including recording of data, signal detection, beam tracking on the data tracks, and grey code detection.

For example, many optical heads have an optical interfacing surface that couples optical radiation to and from the storage medium. This interfacing surface may be an optical surface of a lens, a small optical flat, or a transparent mesa formed as part of a lens. One technical challenge is to maintain this interfacing surface free of contaminants which may be formed on the interfacing surface from a variety of sources. One source is localized heating at and near the focused spot on the recording medium surface by absorption of a focused optical beam. Certain species on the recording medium surface may become desorbed due to the localized heating and transfer to adhere to the optical head. Other sources include material deposited on the optical head through intermittent contacts between the optical head and the medium surface, and particulates present in the disk drive.

Contaminants adhered to the interfacing surface in the path of the optical signals can adversely affect the signals by causing signal distortions. Such signal distortions, in turn, can lead to loss of tracking, track misregistration, data jitter, reduction in the signal-to-noise ratio, or other problems that degrade the performance or even cause malfunction of the system.

SUMMARY

The present disclosure provides an optical data storage system having a cleaning mechanism that cleans an optical head by contacting an optical interfacing surface of the head to another element in a controlled manner, or placing the optical interfacing surface of the head in a close proximity of, or in at least partial contact with a surface of the storage medium.

The cleaning mechanism includes a detection module to detect and determine the degree of contamination of the interfacing surface of the optical head. The detection module measures a contamination-induced distortion in an optical signal received by the optical head from the optical storage medium. When such a distortion exceeds a tolerance range, the interfacing surface is cleaned in order to maintain the performance of the disk drive.

The cleaning mechanism may implement different ways of cleaning the interfacing surface of the optical head. In one embodiment, the cleaning mechanism is configured as a "on-demand" mechanism which operates to clean the interfacing surface only when the system so requests. The cleaning mechanism may also be configured as an "automatic" mechanism which automatically cleans the interfacing surface whenever a certain operation is performed, such as reading and writing data to the disk, loading or unloading the head. This two type of cleaning mechanisms may be combined in a disk drive.

In one implementation of the on-demand cleaning mechanism, the optical head may be controlled to briefly and lightly contact the interfacing surface with the surface of the storage medium so as to remove the contaminants from the interfacing surface.

In an optical disk drive where the optical head is suspended over the optical disk by an air bearing surface, the contact between the optical head and the disk surface for cleaning may be brought about by reducing the spinning speed of the disk so that the up-lifting force of the air bearing is reduced to allow a light contact. Another implementation reduces or turns off the power to the spindle motor that drives the disk for a brief period. The speed of the disk is so reduced that the desired light contact occurs and cleans the interfacing surface of the head.

When the interfacing surface of the optical head is an optical surface of a transparent mesa structure formed in the optical head, the above light contact can be caused by momentarily supplying sufficient heat to the mesa so that the thermal expansion of the mesa structure brings the interfacing surface into contact with the disk surface. In this implementation, the disk may be maintained at the speed for the normal operation during the brief contact. A heating coil or thin-film heater may be formed around the mesa structure to provide the heat without intercepting the optical path between the head and the disk.

In another implementation, the interfacing surface of the optical head is cleaned by briefly contacting a cleaning element during loading and unloading the optical head to and from the disk. The cleaning element is disposed relative to the ramp of the disk drive that receives the stinger engaged to the suspension arm of the optical head when the optical head is unloaded from or loaded onto the disk so that a cleaning surface of the cleaning element lightly touches the interfacing surface to remove contaminants every time the optical head is loaded or unloaded. During normal operation, if the detection module determines that the head needs cleaning, the disk drive can temporarily interrupt the operation and clean the optical head by performing an unload/load operation. Therefore, this mechanism can function both as an on-demand cleaning mechanism or as an automatic cleaning mechanism.

The automatic cleaning mechanism may also be implemented by placing the interfacing surface of the head in close proximity from a surface of the storage disk to prevent accumulation of contaminants. A spacing sensor, e.g., an acoustic emission sensor, or optical detection of mass transfer from the disk to the head, may be used to determine the position of the interfacing surface in the close proximity. The optical drive can operate continuously when the head is in close proximity of the disk during writing and reading and the interfacing surface is automatically cleaned.

Any of the above cleaning techniques may be used either individually or in a combination in a disk drive. Advantages of the invention include improvements in performance and reliability of a disk drive and reduction in maintenance over the lifetime of the disk drive.

These and other aspects and associated advantages of the present invention will become more apparent in light of the following detailed description, the accompanying drawings, and the appended claims.

DETAILED DESCRIPTION

Figure 1:
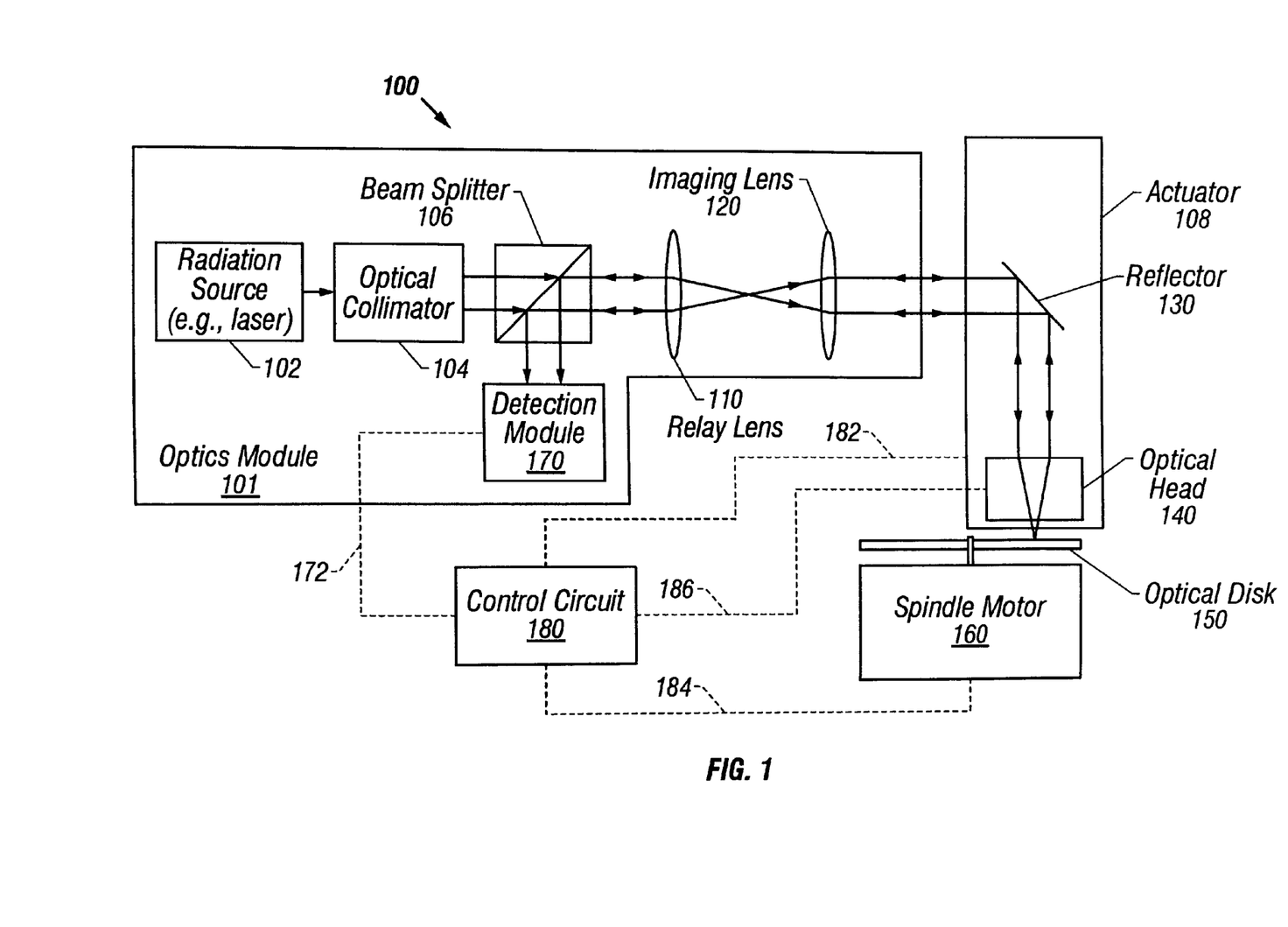
FIG. 1 is a block diagram of one embodiment of an optical disk drive.

FIG. 1 is block diagram of some basic features of an optical disk drive 100 in accordance with one embodiment. A radiation source 102 such as a laser produces a beam at a specified wavelength for recording and retrieving data. An optical disk 150 includes at least one storage layer for data storage. The storage layer is formed of a suitable material such as a magneto-optical material or phase-change material. Data is spatially distributed and stored in the storage layer by a suitable encoding method. An optical beam from the radiation source 102 is collimated by an optical collimator 104 and then projected to an optical head 140 by a relay lens 110 and an imaging lens 120.

A disk holding unit 160 holds the optical disk 150 relative to the optical head 140 at a desired distance so that the optical energy can be properly coupled between the optical head 140 and the disk 150. The optical disk 150 may be a removable medium or a fixed medium. The disk holding unit 160 includes a spindle for holding the disk 150 and a spindle motor that rotates the disk 150 around the spindle at a desired speed. A disk load and unload unit may also be included when the disk drive 100 is the removable type in which a disk can be removed and a different disk can be loaded.

The optical head 140 is configured to produce a lensing effect and thereby to focus the beam to a desired recording layer in the disk 150. The optical head 140 also couples the reflected beam from the disk 150 to a detection module 170 that includes at least one data detector to extract data signals from the reflected beam and a tracking detector to produce a tracking error signal indicating the relative position of the beam from a desired track on the disk. A beam splitter 106 may be disposed to guide the reflected beam from the disk 150 to the detection module 170. The output beam from the radiation source 102 may be polarized and the beam splitter 106 may be a polarizing prism in order to transmit the output beam while directing the reflected beam to the detection module 170 by using a polarization rotator (e.g., a quarter wave plate between the beam splitter 106 and the disk 150).

An actuator 108 is implemented to position the optical head 140 over a desired position of the disk 150. A reflector 130 may be placed on the actuator 108 to couple radiation to and from the optical head 140 so that the beam impinging upon the disk 150 is substantially perpendicular to the disk surface. The optical head 140 may be engaged to the actuator 108 by a suspension arm so that the optical head 140 is supported over the disk 150 at a desired spacing of less than one wavelength (e.g., less than 200 nm) by air bearing to maintain a near-field configuration. Either a linear actuator or a rotary actuator may be used.

Optical elements, including the light source 102, the detection module 170 and beam guiding elements 106, 110, 120, 130, and the optical head 140, are fixed relative to one another with a predetermined spatial relation. The light source 102, the collimator 104, the beam splitter 106, the detection module 170, and beam guiding elements 110, 120, may be fixed in an optics module 101. The optics module 101 may be fixed on a base of the disk drive 100 to form a fixed optics module or mounted on the actuator 108 to move with the actuator 108 as a movable optics module.

A control unit 180 generates a control signal 182 to control the operation of the actuator 108 and to receive the signal 172 from the detection module 170 that includes the tracking error signal or the read-only signal. The control unit 180 also controls one or more beam-steering devices that control the direction of the beam to the optical head 140 in response to the tracking error signal.

Figure 2:
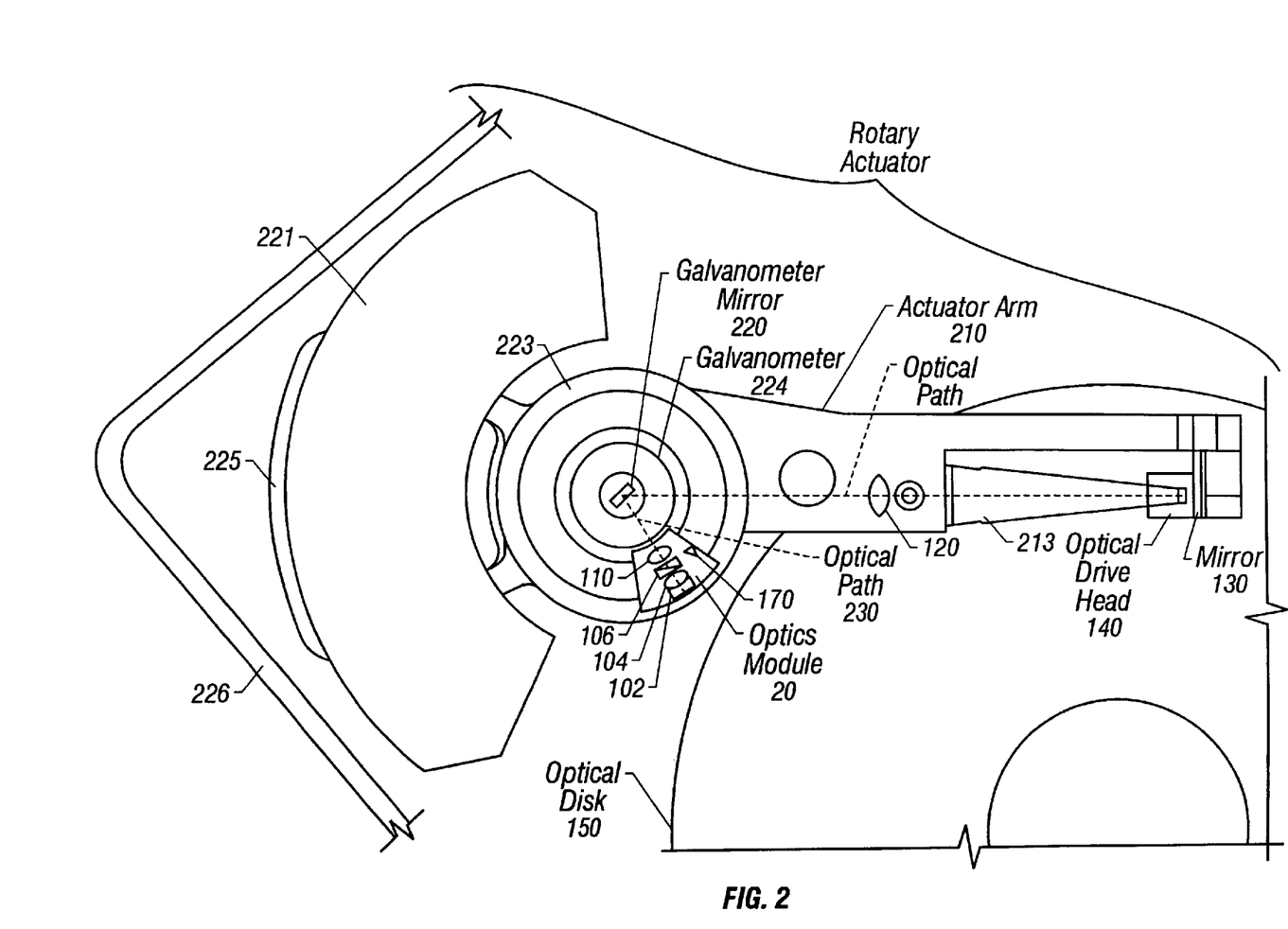
FIG. 2 schematically shows a portion of an optical disk drive with a rotary actuator.

FIG. 2 schematically shows one implementation of the disk drive illustrated in FIG. 1 based on a rotary actuator with a movable optics module. A suspension arm 213 engages the head 140 to the rotary arm 210. Other components of the optical train are shown mounted on the rotary arm 210. One end of the actuator arm 210 has a hub 223 and another end has the mirror 130 that directs the beam to the head 140. The actuator rotates with respect to the axis of the hub 223. A galvanometer 224 is placed on the hub 223 to control a mirror 220 that steers the direction of the beam from the light source 102 to the optical head 140. This provides a fine beam tracking mechanism for the disk drive. The galvanometer mirror 220 may be steered based on the tracking error signal to reduce the tracking error.

The optical head 140 may include an objective lens and a near-field lens to couple the beam to and from the disk 150. The objective lens and the near-field lens are fixed to the optical head 140 and have predetermined spacing from each other. In operation, the near-field lens is spaced from the disk 150 by less than one wavelength in the near-field configuration. The desired focusing of the beam on the disk 150 is not maintained by a conventional active control of a focusing servo but instead by the air gap caused by the air bearing action.

The near-field lens is preferably made of a high-index optical material to produce a large effective numerical aperture ("NA"), i.e., NA=n sin $\theta_0$, where n is the refractive index of the near-field lens and $\theta_0$ is the maximum ray angle from the near-field lens to the focus point. For example, a solid immersion lens ("SIL"), a graded index lens ("GRIN lens") or a "Gradium lens" may be used as the near field lens to achieve a NA up to and greater than unity. An apertured laser mounted on the slider can also be used to generate a light spot smaller than a spot limited by diffraction in close proximity to the disk.

A number of implementations of the system 100 in FIG. 1 and their operations are described in U.S. patent application Ser. No. 08/846,916, now U.S. Pat. No. 6,243,350, filed on Apr. 29, 1997. Designs of optical heads with a solid-immersion lens for near-field recording are also disclosed in U.S. patent application Ser. Nos. 08/926,907, now U.S. Pat. No. 5,881,042, filed on Sep. 9, 1997 and 08/657,145, now U.S. Pat. No. 6,270,696, filed on Jun. 3, 1996.

The near-field lens has a flat optical surface as an interfacing surface of the head 140 to couple optical radiation to and from the disk 150. This interfacing surface is exposed to the air and hence can be contaminated by adsorbed molecules, particles, smears, and the like from the disk 150 or the environment. Intermittent contacts between the optical head 140 and the disk surface can also deposit wear debris, lubricants, and other materials on the optical head 140. The amount of contaminants on the interfacing surface should be kept low so that the contamination-induced distortions on the optical signals are below a predetermined tolerance level.

The control unit 180 measures the signal distortions in the received signals by using the detection module 170. The distortions of the signals may be measured from the tracking error signal. See, U.S. patent application Ser. No. 09/227,778, now U.S. Pat. No. 6,069,853, entitled "Heated Optical Head for Optical Storage Systems" and filed on Jan. 8, 1999. In the embodiment in FIG. 1, the detection module 170 functions as a contamination detection module. Variations of the envelope of the tracking error signal are measured to determine the degree of the contamination on the interfacing surface. These variations can be used to detect contact or proximity between head and disk surfaces. Next, the control unit 180 produces an output that commands cleaning of the interfacing surface if the measured signal distortion exceeds the predetermined tolerance level. That output can be any of the types described in this specification, to effect any of the cleaning techniques described in this specification.

The cleaning techniques in this disclosure involve momentarily and slightly contacting the interfacing surface with another surface in the disk drive when the cleaning is desired. The contaminants on the interfacing surface are thus rubbed off by such a contact. The contact is controlled in a way that the interfacing surface is not significantly damaged to affect the proper operation of the optical head during the normal lifetime of the disk drive. The load of the head exerted on the another surface during a contact cleaning on the disk surface may be a fraction of the normal loading force due to the action of the air bearing (e.g., one tenth of a gram or less). The interfacing surface may be in contact with either the surface of the spinning disk or a cleaning surface of a cleaning element disposed relative to the actuator in the disk drive.

One way to clean the interfacing surface by contacting the disk surface is to momentarily slow down the spinning speed of the disk 150 during a normal operation. When the disk is spinning at a predetermined operating speed for reading or writing operations, the optical head 140 is suspended over the surface of the disk 150 at a desired distance by the air bearing. As the disk speed is reduced from the predetermined operating speed, the force generated by the air bearing to support the head 140 decreases since the magnitude of the force is approximately proportional to the spinning speed of the disk under proper conditions. Hence, the reduced disk speed reduces the spacing between the head 140 and the disk 150.

The disk speed can be reduced to a low speed that the head 140 comes into light contact with the disk surface while the air bearing still produces a sufficient lifting force to prevent the head 140 to land and slide on the disk 150. For example, the normal spinning speed of the disk drive 100 may be in a range above about 2400 rpm depending on the design of the head 140. The desired reduced speed for bringing the head 140 into a slight contact with the disk 150 may be in an approximate range of about 300 rpm to about 600 rpm. The disk 150 is maintained at the reduced speed only for a brief period, e.g., on the order of milliseconds, to allow the disk surface to remove the contaminants from the interfacing surface of the head 140. The disk 150 is then back to its normal operating speed to lift the head 140 away from the disk 150 to the desired flying height and to resume the normal operation. Due to the action of the air bearing surface, only the trailing edge of the air bearing surface of the head is in physical contact with the disk.

The above cleaning operation is controlled by the control unit 180 via the electrical connection 184. The control unit 180 may command the spindle motor to operate at the reduced speed to contact the interfacing surface with the disk 150. Alternatively, the control unit may temporarily reduce or turn off the power to the spindle motor for a predetermined brief duration and then resume the normal power supply for the normal operation.

Another way to clean the interfacing surface by contacting the disk surface is based on thermal heating of the interfacing surface formed from a flat surface of a small transparent mesa as part of the near-field lens. The control circuit 180 sends appropriate signals 186 to provide a short burst of thermal energy to the mesa region of the optical head. The heated mesa expands to shift the position of the interfacing surface towards the disk by the spacing of the air gap so that interfacing surface comes into contact with the disk surface. This implementation of the contact cleaning can be achieved without changing the spinning speed of the disk 150.

Figure 3A:
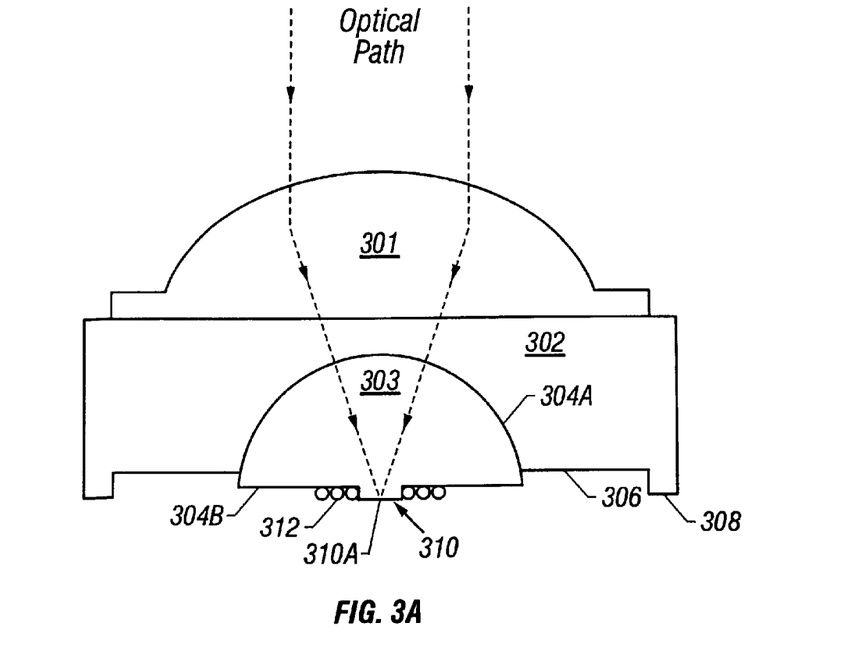
FIGS. 3A, 3B and 3C show three examples of an optical head having a transparent mesa formed as a part of a near-field lens.

FIG. 3A illustrates one example of the optical head 140 having an objective lens 301 and a hemispherical SIL 303 as the near-field lens. Lenses 301 and 303 are fixed to a slider substrate 302. The substrate 302 has a top surface on which the objective lens 301 is positioned and a bottom surface 306 on which an air-bearing surface 308 is formed. The lens 303 may be mounted within either an indentation in the substrate 302 which is transparent or a through hole in the substrate 302 which may not be transparent. The lens 303 has a spherical surface 304A and a flat surface 304B. The flat surface 304B includes a transparent mesa 310 in the optical path of head 140, e.g., near or at the center of the surface 304B. The mesa 310 protrudes the surface 304B and may be formed by processing the flat surface 304B or by engaging a separate piece to the flat surface 304B. In the latter case, the index of refraction of the mesa is preferably equal or close to that of the lens 303.

The mesa 310 has a flat mesa surface 310A as the interfacing surface to couple optical energy to and from the disk 150. The dimension of the mesa 310 is configured to make the mesa surface 310A as small as possible but sufficiently large to allow transmission of the focused beam without clipping and beam steering. For example, the mesa 310 may be about 10–15 µm in height and the surface 310A may have a dimension about 30 µm×60 µm. The hemispherical SIL 303 is positioned in the substrate 302 relative to the surface 306 to place the mesa surface 310A in a substantially the same plane with the air-bearing surface 308.

A coil 312, or a heating unit, is formed around the mesa 310 to provide sufficient heat for heating the mesa to shift the surface 310A away from the flat surface 304B. The control unit 180 is connected by the connection 186 to supply an electric current to the coil 312 to heat the mesa 310 during a cleaning process. The resistance of the coil 310 or the current to the coil 310 may be sufficiently large to generate enough heat so that the thermal expansion of the mesa 310 can shift the mesa surface 310A through the air-bearing gap to reach the disk 150. The current to the coil or heater 310 is reduced or turned off after the cleaning. This makes the mesa surface 310A lose contact with the disk surface and resume its normal position. Since the flat surface 306 of the substrate 302 is tilted relative to the disk surface during normal operation due to the air bearing action, the small mesa surface 310A is more accessible by the disk surface than the air bearing surface 308.

Figure 3B:
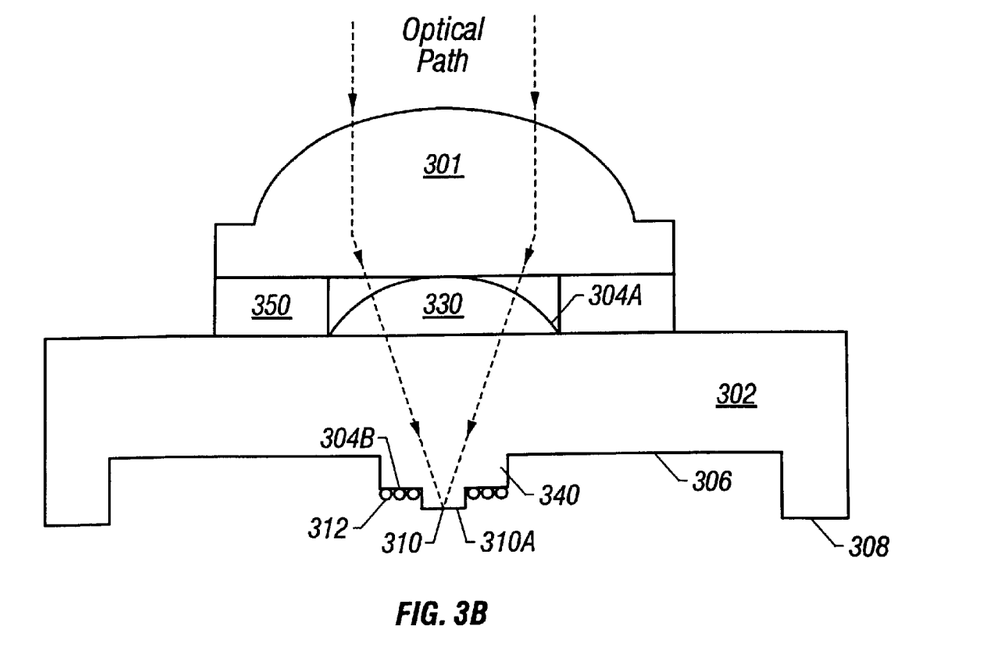

FIG. 3B shows another example of the mesa formation in the optical head 140. The substrate 302 is formed of a transparent material. A cap lens 330 with a spherical cap surface 304A forms one part of an effective near-field lens to function as the SIL 303 in FIG. 3A. The remaining part of the near-field lens is formed by part of the substrate 302. The substrate 302 includes a standoff 350 on its top to position the objective lens 301 in the optical path of the head 140. A protrusion structure 340 is formed on the bottom surface 306 on which the bottom surface 304B of the near-field lens and the mesa 310 are formed. The mesa surface 310A is substantially coplanar with the air-bearing surface 308.

The lensing effect of the objective lens and the near-field lens may also be achieved by an integral optical element such as an optical element formed of an index-gradient material as disclosed in the now U.S. Pat. No. 6,243,350 and a diffractive optical element. The above mesa 310 can be formed on the bottom flat surface of the integral optical element to implement the cleaning mechanism by thermal expansion.

Figure 3C:
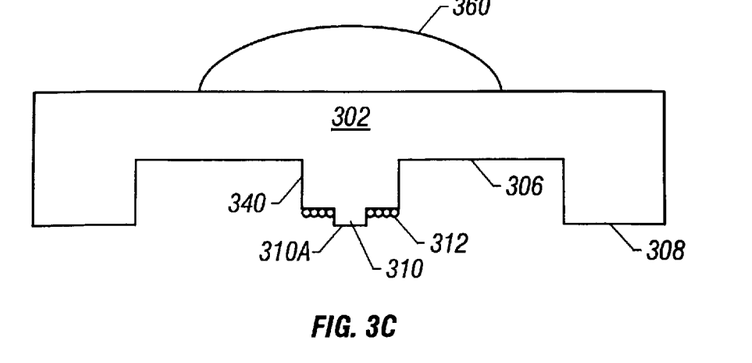

FIG. 3C further shows a third example of the mesa formation in the optical head 140. A lens 360 has an aspherical surface and is mounted on top of the slider 302. The lens 360, the protrusion structure 340, and the mesa 310 operate in a combination to produce the lensing effect of the objective lens and the near-field lens in the examples of FIGS. 3A and 3B.

A surface heating element formed of a thin-conducting film may be used either to replace the coil 312 or to work with the coil 312 in combination to provide the needed heating for contact cleaning. Such a surface heating element can be optically transparent and formed over or around the mesa surface 310A. One example of such a film is a conducting ITO layer. A non-transparent conducting film may also be formed around the mesa to supply the heat for shifting the mesa surface 310A by thermal expansion. Metal alloys such as NiCr, NiCu, CuZn, etc. may be used to form a non-transparent conducting film.

The above mesa formation in the optical head and the associated cleaning by thermal expansion may be used with any type of storage materials in the near-field configuration, including but not limited to, a phase-changing material or a magneto-optic material. For a magneto-optic disk, a magnetic field is needed for recording data to the disk. A separate coil may be formed around the mesa 310 to produce the desired magnetic field. The heating coil 312 may be replaced by a thin-film surface heater in order to accurately control the magnetic field separately with the coil. However, the coil 312 for heating the mesa 310, when properly configured, may also be used to generate both the thermal energy for mesa protrusion and the magnetic field for recording operations. The number of turns of the coil 312 may be sufficient to generate a desired magnitude of the recording magnetic field from a low current without causing significant heating to the mesa 310.

In implementing the above two techniques of cleaning by contacting the disk surface, it is preferable to make the interfacing surface contact the peripheral region of the disk 150 than the central region. The removed contaminants from the interfacing surface can be readily removed from the disk 150 by centrifugal forces when the contact is made at the peripheral region of the disk 150. Hence, when it is determined that the head 140 needs to be cleaned, the control unit 180 may first command the actuator 108 through the connection 182 to place the head 140 at a peripheral region of the disk 150 and then execute one of the above cleaning processes by either slowing down the disk or thermal expansion. A seeking command may also be generated by the control unit 180 to wiggle the optical head 140 so as to enhance the contact cleaning.

The disk 150 may be specially structured for the above contact cleaning at the peripheral region. The disk 150 may be divided into a central storage region and a peripheral cleaning region. The central storage region includes one or more recording layers and at least one transparent overcoating layer on the surface. The peripheral cleaning region, however, is used for contact cleaning and thus can use a hard and durable material on the surface, such as a carbon-containing material. The surface coating layer on the peripheral region may be optically absorptive since the region is not used for recording. In addition to contact cleaning, the peripheral region may also function as a landing zone during loading and unloading of the optical head. In one implementation, a carbon overcoat layer of about 10 nm may be formed on top of regular layers in the peripheral region.

A third way of cleaning the head 140 uses a cleaning element positioned in the disk drive to contact and thus to clean the interfacing surface when the head 140 is loaded to or unloaded from the disk 150. In the disk drive 100 in FIG. 1, loading or unloading the head 140 involves movement of the actuator 108 to place the head 140 unto or away from the disk 150. The control unit 180 can be configured to control the loading or unloading the head 140. When unloaded, the actuator 108 and the head 140 are placed on a support member in the disk drive 100. The cleaning element is placed on the path between a resting position of the head 140 when unloaded and the disk 150. The cleaning element has a cleaning surface positioned to contact and clean the interfacing surface of the head 140 during loading and unloading of the head 140.

Figure 4A:
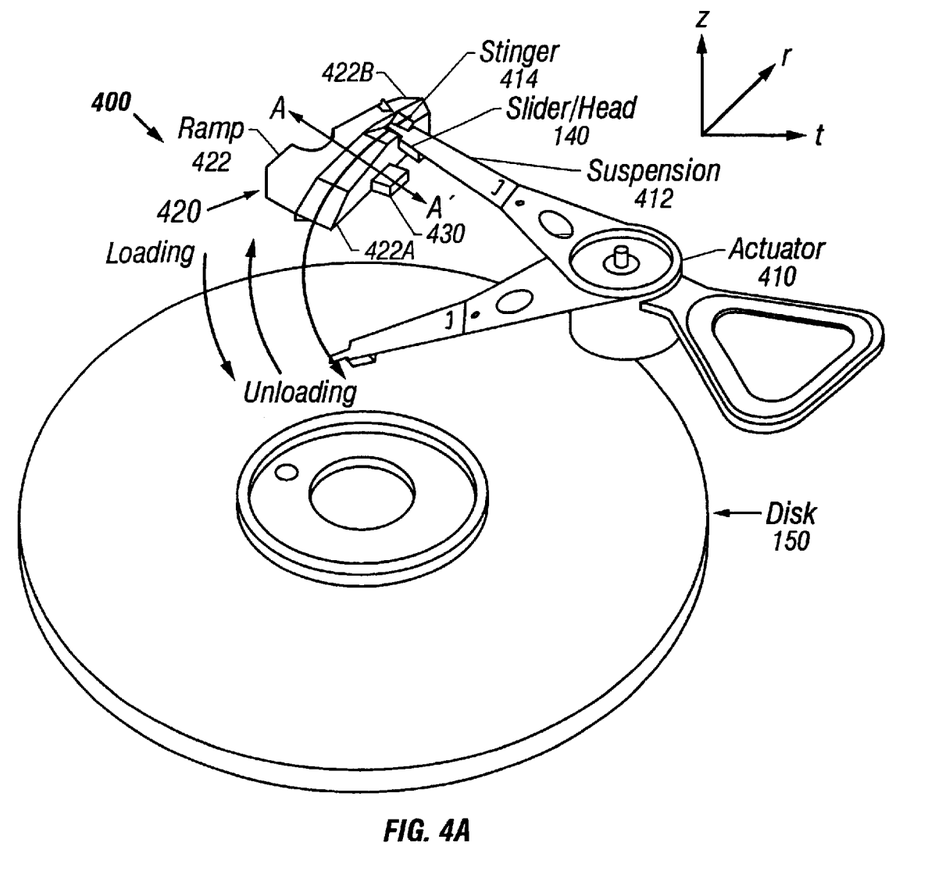
FIG. 4A shows an optical disk drive having a support member for placing the optical head in an unloaded position.

FIG. 4A shows a disk drive 400 with a rotary actuator 410 and a support member 420 located on the side of the disk 150 for supporting head 140 when unloaded. The support member 420 includes a ramp 422 in the path of the head 140 between the resting position 422B of the head 140 in the support member 420 and the disk 150. The ramp 422 is sloped from a beginning point 422A and leads to the resting position 422B. The actuator 410 has a suspension arm 412 that engages the optical head 140. The suspension arm 412 has stinger 414 that extends beyond the head 140. The stinger 414 slides on the ramp 422 during loading or unloading process and keeps the optical head 140 away from touching other objects.

Figure 4B:
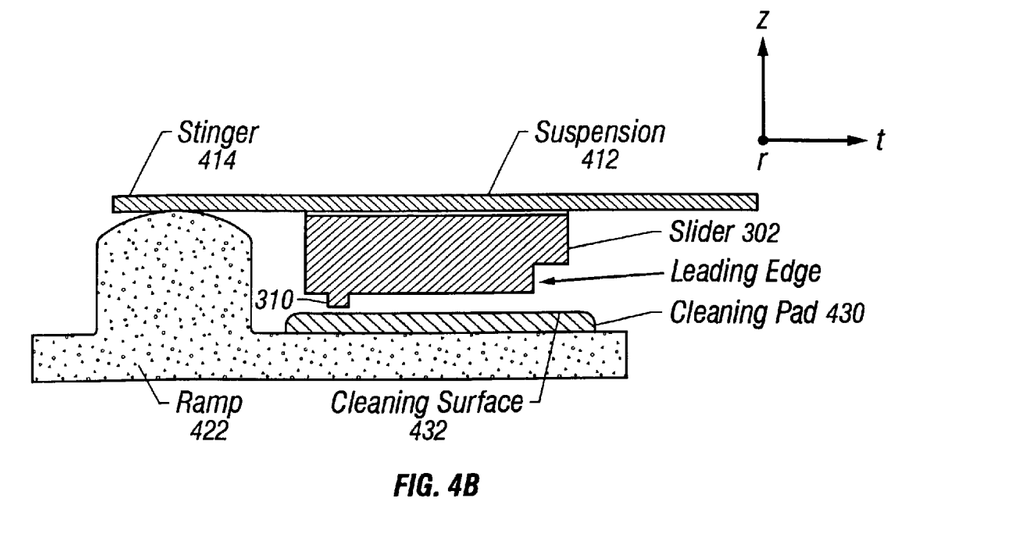
FIGS. 4B and 4C show two examples of placing a cleaning element in the path of the optical head during loading and unloading in the system of FIG. 4A.
Figure 4C:
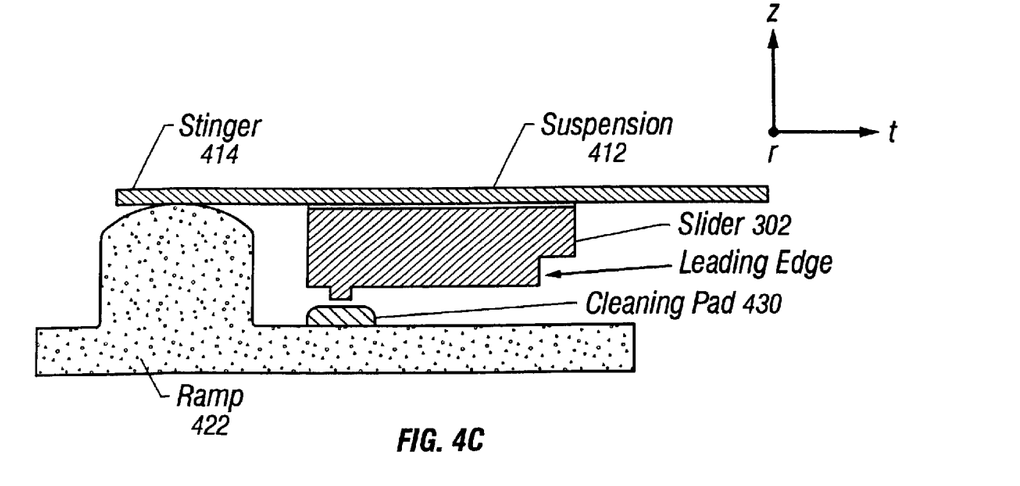

FIGS. 4B and 4C show two different configurations for placing a cleaning element 430 relative to the ramp 422. The configuration in FIG. 4B cleans both the air-bearing surface of the slider 302 and the mesa 310. The configuration in FIG. 4C is designed to primarily clean the mesa 310 only. The cleaning element 430 is placed on the side of the ramp 422 and can be located anywhere between the beginning point 422A and the resting position 422B of the ramp 422. The cleaning element 430 includes a cleaning surface 432 suitable for cleaning an optical surface. The cleaning surface 432 may be formed of a lightly abrasive material. Each time when the head 140 slides over the cleaning element 430, the interfacing surface of the head 140 touches the cleaning surface 432 and hence is cleaned. The cleaning element 430 may be formed of a resilient material such as a rubber. Hence, when in contact with the head 140, the cleaning element 430 may be slightly deformed to adapt to the shape of the contacting portion of the head 140 to increase the contact area with the interfacing surface. This improves the result of the contact cleaning by the cleaning surface 432.

Therefore, the optical head 140 is cleaned every time when the head 140 is loaded or unloaded. The actuator 410 may be controlled to cause a jittering or wiggling of the head 140 during loading and unloading to enhance the contact cleaning. During a normal operation, if the signal distortion measured by the detection module 170 is above the tolerance level, the control unit 180 will interrupt the operation and command the actuator 410 to unload the head 140 for cleaning the interfacing surface.

A heating film or coil may be formed around or on the mesa 310 in the disk drive 400 in FIG. 4A. During loading and unloading of the head 140, excessive heat may be applied to the mesa 310 to cause the temporary protrusion of the mesa 310. This operation can enhance the contact cleaning by the cleaning element 430.

In yet another embodiment, the optical head may be cleaned by controlling the interfacing surface of the head in close proximity of the disk surface without fully contacting the disk. In this embodiment, the average spacing between the disk surface and the interfacing surface of the head is much less than one wavelength of light and may vary with the roughness of the interfacing surface of the optical head and the disk surface. For example, the average spacing may be preferably less than about 50 nm, and under certain conditions, may be approximately less than 25 nm but greater than a few nm (say, 2 nm). Hence, the relative motion of the optical head and the disk during operation in such close proximity prevents contaminants from accumulating and growing to sizes greater than the spacing between the interfacing surface of the optical head and the disk surface. The inventors discovered that, when sizes of contaminants are so limited, they are not sufficient to cause significant signal distortions above the acceptable distortion level for many practical disk drives in near-field configurations. In addition, due to the roughness of the surface of the disk and the interfacing surface of the head, the interfacing surface often has intermittent contact with the surface of the disk in such close proximity regime during normal operation. The intermittent contact also prevents contaminants from accumulating on the interfacing surface.

Figure 5:
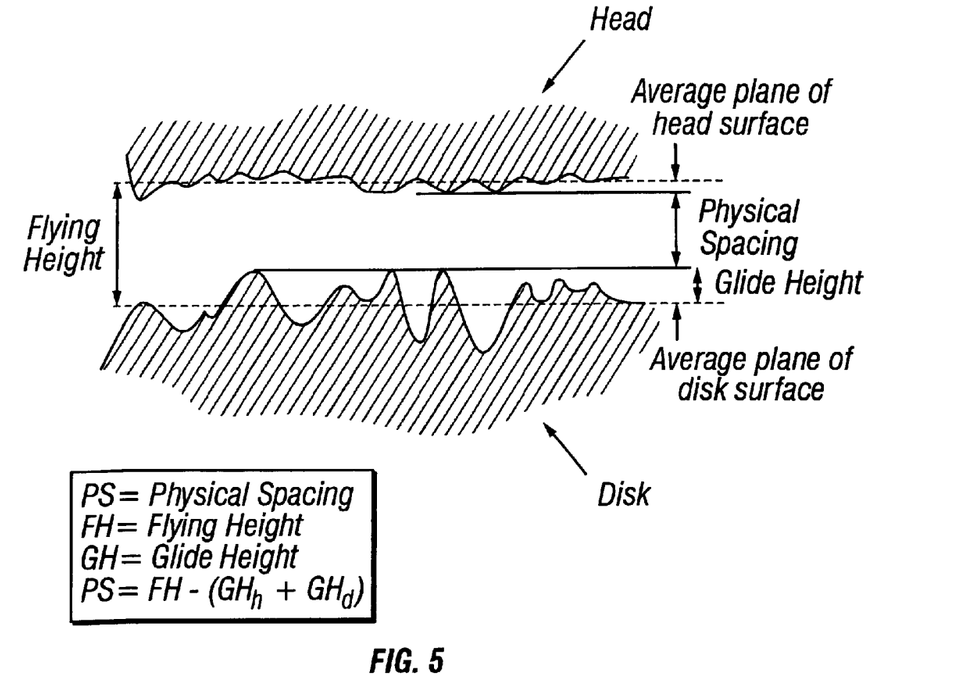
FIG. 5 is a diagram illustrating different dimensions associated with the interfacing surface of the optical head and the disk surface in the close proximity regime under the near-field configuration, where the glider height of each surface is the difference between the height of the highest asperity and the average height of the surface.

The surfaces of the interfacing surface of the head and the disk are not ideally flat and smooth. Each surface has a certain degree of roughness of a fraction of one wavelength, typically ranging from few tens of one nanometer to few nanometers. Hence, strictly speaking, the absolute spacing between the interfacing surface and the disk surface varies from point to point. Therefore, the average value of the varying spacing values between the two surfaces is used to describe the optical interaction between the head and the disk. FIG. 5 illustrates various dimensions and spacings associated with the interfacing surface of the optical head and the disk surface in the above close proximity regime under the near-field condition. The physical spacing between the head and the disk is the minimum spacing. The average spacing, which is greater than the physical spacing, is the flying height of the optical head.

In the above close proximity regime, depending on the degree of roughness, certain parts of the two surfaces may be in intermittent contact while the average spacing is still greater than zero. The cleaning of the interfacing surface is a combination effect of such intermittent contact and the closeness of the two surfaces on the average. As the averaged spacing decreases, the degree of contact between the surfaces increases. Hence, the average spacing can be measured by measuring the degree of contact.

Referring back to FIG. 1, one or more suitable sensors may be deployed at or near the optical head 140 to determine the spacing between the interfacing surface and the disk 150. The control circuit 180 may be communicated with the sensors and designed to precisely control the spacing in order to operate the system in the close proximity regime according to the measurements from the sensors.

One implementation uses acoustic emission sensors to measure the degree of contact between the interfacing surface of the head and the disk surface. An acoustic emission sensor can be formed of a piezoelectrical element which produces an electrical signal under mechanical stress. When such a sensor is placed at or near the optical head, the acoustic waves generated by vibration of the optical head from contacting the disk surface can be detected by the sensor. Because the strength of the acoustic waves is associated with the degree and frequency of the contact between the optical head and the disk, the initial contact of asperities on both surfaces and the average spacing can be determined by measuring the acoustic waves.

Figure 6:
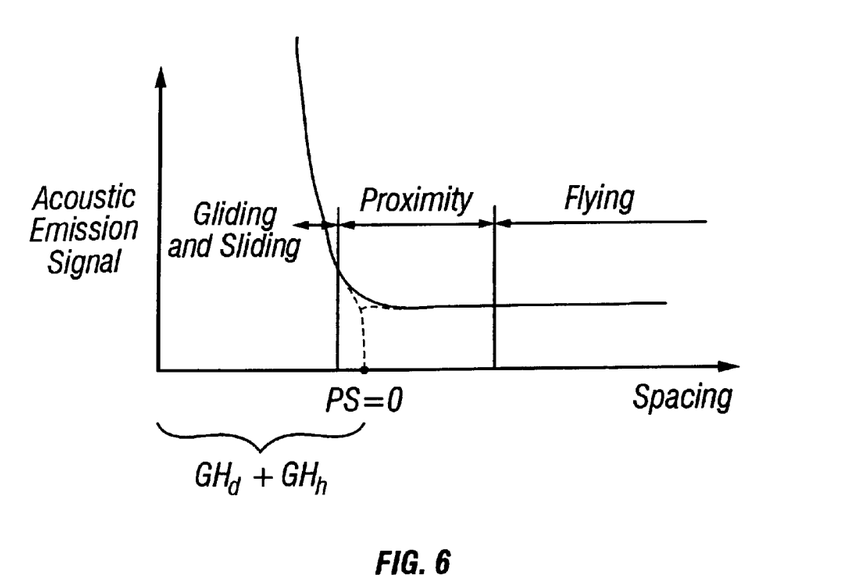
FIG. 6 illustrates the measured acoustic emission signal as a function of the spacing between the head and the disk.

A sensing circuit unit, which may be built into the control circuit, can be coupled to a sensor to determine the average spacing between the optical head and the disk surface. The control circuit can either control the flying height of the head or control the thermal expansion of the mesa to adjust the spacing to a desired value in the close proximity regime based on the signals from the sensor. FIG. 6 illustrates the dependence of the acoustic signal on the spacing between the head and the disk.

One or more acoustic emission sensors can be used. A sensor can be at any location that receives sufficient amount of the acoustic waves generated from the head. A sensor may be located on the head, on the suspension arm, or on the actuator arm. Since the strength of the acoustic waves decrease with the distance from the point of generation, a sensor is preferably located on or near the head.

Another technique for detection of the degree of contact between the head and the disk uses one of the optical signals coupled between the head and the disk. The tracking error signal, for example, may be used. When the optical head flies above the disk and the disk drive is performing track following, the tracking error signal is substantially constant with a low level of noise, under normal operation. However, when the optical head is in contact with the disk, vibrations are excited by the friction of such contact and hence cause signal modulations in the tracking error signal. Therefore, measurements of such signal modulations can be used to determine the transition between the flying regime where the head and disk do not contact and the close proximity regime where the head and disk have some contacts. In addition, the spacing at which the tracking error signal distortions due to mass transfer from the disk to the head disappear can also be used to indicate whether the head is in close proximity from the disk.

A number of techniques may be used to bring the optical head in the close proximity of the disk surface. For example, the spinning speed of the disk can be adjusted by controlling the spindle motor so that the force of the air bearing action keeps the head in the close proximity. A heating element may be placed on or near the mesa surface to thermally expand the mesa so that the position of the mesa surface relative to the slider is shifted to adjust and control the spacing between the mesa surface and the disk surface. A piezo-electric element may also be incorporated in the optical head to control the position of the mesa relative to the slider in response to an control signal (e.g., a piezo-electric ring can be sandwiched between the slider and the mesa). Furthermore, an electrostatic displacement mechanism may be used to achieve the same. Such a displacement mechanism may include an element that effects a capacitor with one plate engaged to the slider and another movable plate engaged to the mesa. The voltage applied to the capacitor can change the spacing of the movable plate and hence the position of the mesa. Similar to the thermal technique, the piezo-electric and electrostatic positioning elements may also be used in head cleaning by direct contact.

Although the present invention has been described in detail with reference to a few embodiments, various modifications and enhancements may be made. For example, the cleaning by contacting the disk surface and the cleaning by contacting the cleaning element near the ramp during loading or unloading may be combined so that the head is automatically cleaned during loading and unloading and, when a cleaning operation is desired during normal operation, the cleaning by contacting the disk surface may be activated rather than unloading and then loading the head. The cleaning techniques by contact may also be applicable in optical disk drives in far-field configurations.

In addition, it should be understood that the same techniques can be applied to optical storage systems with other types of near-field optical elements rather than a near-field lens with a flat interfacing surface. For example, the optical head may use a solid immersion mirror, a tapered optical fiber near-field recording head, or a high-index slider with a diffractive optical element (e.g., a diffractive lens) on a high-index transparent slider. See, Lee et al., "Feasibility study on near field optical memory using a catadioptric optical system," Optical Data Storage, 1998 Technical Digest Series, Vol. 8 and Japanese laid-open patent application No. 8-245053 by Hatakoshi et al.

Furthermore, the disclosed techniques may be applied to a near-field optical storage system where the optical head includes a semiconductor laser directly mounted on a slider. The output laser beam is directly coupled from the output facet of the laser to the disk. In this case, the interfacing surface of the optical head is the output facet of the laser.

These and other variations are intended to be fully encompassed by the following claims.

What is claimed is:

1. An optical disk drive for retrieving data from or writing data to an optical disk, comprising:

an optical head having a flat surface and a transparent mesa formed on said flat surface, said mesa including a transparent mesa surface to couple optical energy, said optical head being suspended over the disk by an air-bearing action caused by spinning motion of the disk;

a heating element formed on said mesa to allow transmission of said optical energy and to generate heat by receiving an electric current to thermally expand said mesa so as to move said mesa surface away from said flat surface and toward the disk;

an actuator engaged to said optical head to load and unload said optical head to and from the disk along a path and to position said optical head over the disk;

a cleaning element having a cleaning surface and disposed relative to said actuator in said path so as to contact and to clean said mesa surface during loading and unloading of said head; and a control unit coupled to receive information on signal distortion in an optical signal passing through said mesa surface and configured to increase said electric current to thermally expand said mesa so as to contact the disk and to remove contaminants when said signal distortion is above a predetermined tolerance level.

2. A disk drive as in claim 1, wherein said heating element includes a transparent conducting film formed over said mesa surface.

3. A disk drive as in claim 1, wherein said heating element includes a conducting film formed around said mesa.

4. A disk drive as in claim 1, wherein said heating element includes a coil formed around said mesa.

5. A disk drive as in claim 1, wherein said mesa surface is spaced from said disk by less than one wavelength and said optical head couples said optical signals to and from the disk at least in part by evanescent waves.

6. A disk drive as in claim 1, wherein said cleaning element is deformable.

7. A disk drive as in claim 1, wherein said cleaning surface is formed of an abrasive material.

8. A disk drive as in claim 1, further comprising a spindle motor engaged to rotate the disk, wherein said control unit operates to reduce a spinning speed of said spindle motor so as to bring said mesa surface into contact with said surface of the disk when said signal distortion is above said predetermined tolerance level.

9. A disk drive as in claim 1, wherein said optical head includes a solid immersion lens.

10. A disk drive as in claim 9, wherein said flat surface is formed on said solid immersion lens.

11. A disk drive as in claim 1, wherein said optical head includes a graded index lens.

12. A disk drive as in claim 1, further comprising at least one sensor coupled to measure a signal indicative of a distance between said optical head and the disk.

13. A disk drive as in claim 12, wherein said sensor includes an acoustic emission sensor and said signal is an acoustic wave signal.

14. A method for operating a disk drive, comprising:

using an optical head to couple optical energy to and from an optical disk through an optical surface on the optical head;

controlling an actuator that holds the optical head to contact a cleaning element outside the optical disk to remove contaminants on the optical surface based on distortion in an optical signal reflected from the optical disk through the optical head; and prior to making the optical head to contact the cleaning element, heating a portion of the optical head to cause temporary protrusion of the optical surface to facilitate the contact with the cleaning element.

15. The method as in claim 14, wherein the cleaning element is located on a path for loading or unloading the optical bead.

16. The method as in claim 15, further comprising:

monitoring a reflected optical signal from the optical head;

determining an amount of contaminants on the optical surface based on distortion in the reflected optical signal; and controlling the actuator to bring the optical surface into a contact with the cleaning element so as to remove the contaminants when the distortion is above a predetermined tolerance level.

17. The method as in claim 16, wherein the contact with the cleaning element is made by first interrupting an operation of the optical head.

18. The method as in claim 14, wherein the optical head includes a mesa to support the optical surface, and wherein the heating is directed to the mesa.

19. The method as in claim 14, wherein the contact is made when loading the optical head onto the optical disk.

20. The method as in claim 14, wherein the contact is made when unloading the optical head off the optical disk.

21. The method as in claim 14, wherein said optical head includes a solid immersion lens.

22. The method as in claim 14, wherein said optical head includes a graded index lens.

23. The method as in claim 14, further comprising controlling the optical surface on the optical head to contact the optical disk when the optical head is over the optical disk to clean the optical surface.

24. The method as in claim 14, further comprising using a sensor to measure a distance between the optical head and the disk, and using the measured distance to control the optical surface on the optical head.

* * * * *